(12) United States Patent
Dantlgraber et al.

(10) Patent No.: US 6,488,258 B1
(45) Date of Patent: Dec. 3, 2002

(54) RELEASABLE CHECK VALVE FOR VERY HIGH SYSTEM PRESSURES

(75) Inventors: Jörg Dantlgraber, Lohr/Main (DE); Falk Müller, Lohr/Main (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 09/856,986

(22) PCT Filed: Nov. 13, 1999

(86) PCT No.: PCT/EP99/08756
§ 371 (c)(1),
(2), (4) Date: May 25, 2001

(87) PCT Pub. No.: WO00/34664
PCT Pub. Date: Jun. 15, 2000

(30) Foreign Application Priority Data

Dec. 4, 1998 (DE) ......................... 198 56 018

(51) Int. Cl.⁷ ............................... F15B 13/01
(52) U.S. Cl. ...................... 251/63.6; 251/325
(58) Field of Search ............... 251/62, 63, 63.4, 251/63.5, 63.6, 325

(56) References Cited

U.S. PATENT DOCUMENTS 3,608,859 A * 9/1971 Hetzer ...................... 251/282
3,806,084 A * 4/1974 Seese ...................... 137/625.38
4,624,445 A * 11/1986 Putnam ...................... 137/522
5,351,601 A 10/1994 Zeuner ...................... 91/445

FOREIGN PATENT DOCUMENTS

| DE | 55511 | 4/1967 |
|----|-------|--------|
| DE | 2856242 | 3/1980 |
| DE | 3407878 | 6/1985 |
| DE | 8809945 | 3/1989 |
| DE | 3913460 | 11/1989 |
| DE | 9306029 | 7/1993 |
| DE | 9405450 | 7/1994 |
| DE | 19714505 | 10/1998 |

* cited by examiner

Primary Examiner—Lesley D. Morris
Assistant Examiner—Patrick Buechner
(74) Attorney, Agent, or Firm—Martin A. Farber

(57) ABSTRACT

A releasable check valve for use with very high system pressures. The check valve is formed such that the poppet piston is relatively smooth-running and that good action and a long service life of the seals are obtained, wherein the receiving bore has essentially the same diameter in the region of the inserts and between the inserts. A spacer bushing is arranged axially between the inserts, in which bushing the piston collar can move separating the two annular spaces on both sides of it fluidically from each other. The bore can be machined from one side, so that the inserts are centered precisely with respect to one another and the poppet piston is guided precisely. This reduces the risk of jamming and the risk of an uneven load on the seals.

6 Claims, 2 Drawing Sheets

RELEASABLE CHECK VALVE FOR VERY HIGH SYSTEM PRESSURES

FIELD AND BACKGROUND OF THE INVENTION

The invention proceeds from a releasable check valve which is intended to be useable for very high system pressures.

Check valves readily permit pressure medium to flow from a first orifice to a second orifice with the closing element being raised from a seat counter to the force exerted by the pressure prevailing in the second orifice and counter to the force of the closing spring by means of a force produced by the pressure in the first orifice. Since the closing element is conventionally acted upon by the pressures on surfaces of identical size, a pressure arises in the first orifice which is higher than the pressure in the second orifice by a pressure difference which is equivalent to the force of the closing spring. The closing spring is only weak so as to keep the losses via the valve small unless the intention is to deliberately build up the pressure medium in the first orifice. The flow through a check valve in the direction from the second orifice to the first orifice is possible only by additional measures through which a releasable check valve is provided. A poppet part is then provided which can act on the closing element in the opening direction and can raise it from the seat counter to the force of the closing spring and counter to the pressure difference between the first and second orifice.

DE 197 14 505 Al has disclosed a releasable check valve. The internal high-pressure forming of tubular semi-finished products is mentioned in the abovementioned document as an example of use of a check valve of this type. The check valve which is shown has a valve housing having a continuous receiving bore which is stepped and is composed essentially of three sections. The diameter of the receiving bore is larger in the two outer sections than in a central section into which the two outer sections merge in steps lying in radial planes. High-strength inserts which are exposed to the system pressure and inserts serving to guide a poppet piston are placed into the two outer sections. The central section of the receiving bore is divided by a piston collar of the poppet piston into two annular spaces of which the one can be acted upon by control pressure via a pilot valve in order to control the check valve or can be relieved from pressure to a tank, and the other is permanently connected to a pressure-medium reservoir and contains a restoring spring for the poppet piston.

It has been found that in the known check valve the poppet piston is not always smooth-running to the desired extent. In addition, the sealing action and the service life of various sealing arrangements between the poppet piston and the inserts were not always unproblematical.

SUMMARY OF THE INVENTION

The invention is therefore based on the object of developing a releasable check valve in such a manner that the poppet piston is not stiff beyond the extent to be expected because of the frictional forces at the seals and a high sealing action and service life of the seals is possible.

According to the invention, this object is achieved in a releasable check valve. The invention is first of all based on the finding that stiffness of the poppet piston, deficient action and limited service life of the seals in the known valve are caused by alignment errors. These in turn are attributed to the fact that those sections of the receiving bore which receive the inserts are machined from different sides of the valve housing. According to the invention, the receiving bore now has essentially the same diameter in the region of the inserts and between the latter, apart from short turned grooves in the axial direction which may be present, so that said receiving bore can be machined from just one side of the valve housing, i.e. without changing the position of the valve housing or of the tool. Arranged axially between two inserts is a spacer bushing which ensures a fixed spacing between two inserts on different sides of the piston collar even when the diameter of the receiving bore is constant. At the same time, by means of the spacer bushing and the piston collar, the two annular spaces on the two sides of the piston collar are separated fluidically from each other, preferably with an additional seal being used.

It is preferred for the two inserts bearing directly against the two end sides of the spacer bushing to be identical to each other, so that the number of different components is small.

In a releasable check valve according to the invention, two inserts may be situated on one side of the spacer bushing, which is advantageous, for example the installation of seals. If a releasable check valve according to the invention is used at very high system pressures, which may amount to 4000 or 6000 bar in internal high-pressure forming, for example, then it is important that the separating gaps between the two inserts are relieved from pressure so that the high system pressure cannot build up there. This is because this pressure would produce such a force at the mutually facing end sides of the radially relatively large inserts that there would be the risk of the valve ripping apart. An annular channel also lies between the inserts and the valve housing in the fluid path for the pressure relief. It is then important for the separating gap between the two inserts to be situated in the region of the annular channel. A check is then possible in a simple manner by the fact that the outermost of the inserts on the one side of the spacer bushing has an edge or surface which, in the designated position of the inserts with respect to the annular channel, lies flush with an end surface of the valve housing.

The effect achieved by the refinement is that the annular spaces on the two sides of the piston collar cannot be acted upon by maximum pressure from the two end sides of the end sections of the poppet piston. To this end, two axially spaced-apart seals are provided between which the gap between the end sections of the poppet piston and an insert is relieved from pressure via a leakage oil connection. The particular refinement of this pressure relief ensures that part of the sealing arrangement in the open turn-out of the second insert can bear axially against a smooth surface of the first insert, which surface does not have any discontinuities.

DESCRIPTION OF THE DRAWINGS

An exemplary embodiment of a releasable check valve according to the invention and the principle of a hydraulic circuit for the internal high-pressure forming, within which circuit a check valve according to the invention can be used, are illustrated in the drawing. The invention is now explained in greater detail with reference to the figures of this drawing, in which.

DESCRIPTION OF THE PREFERRED EMBODIMENT

Figure 1:
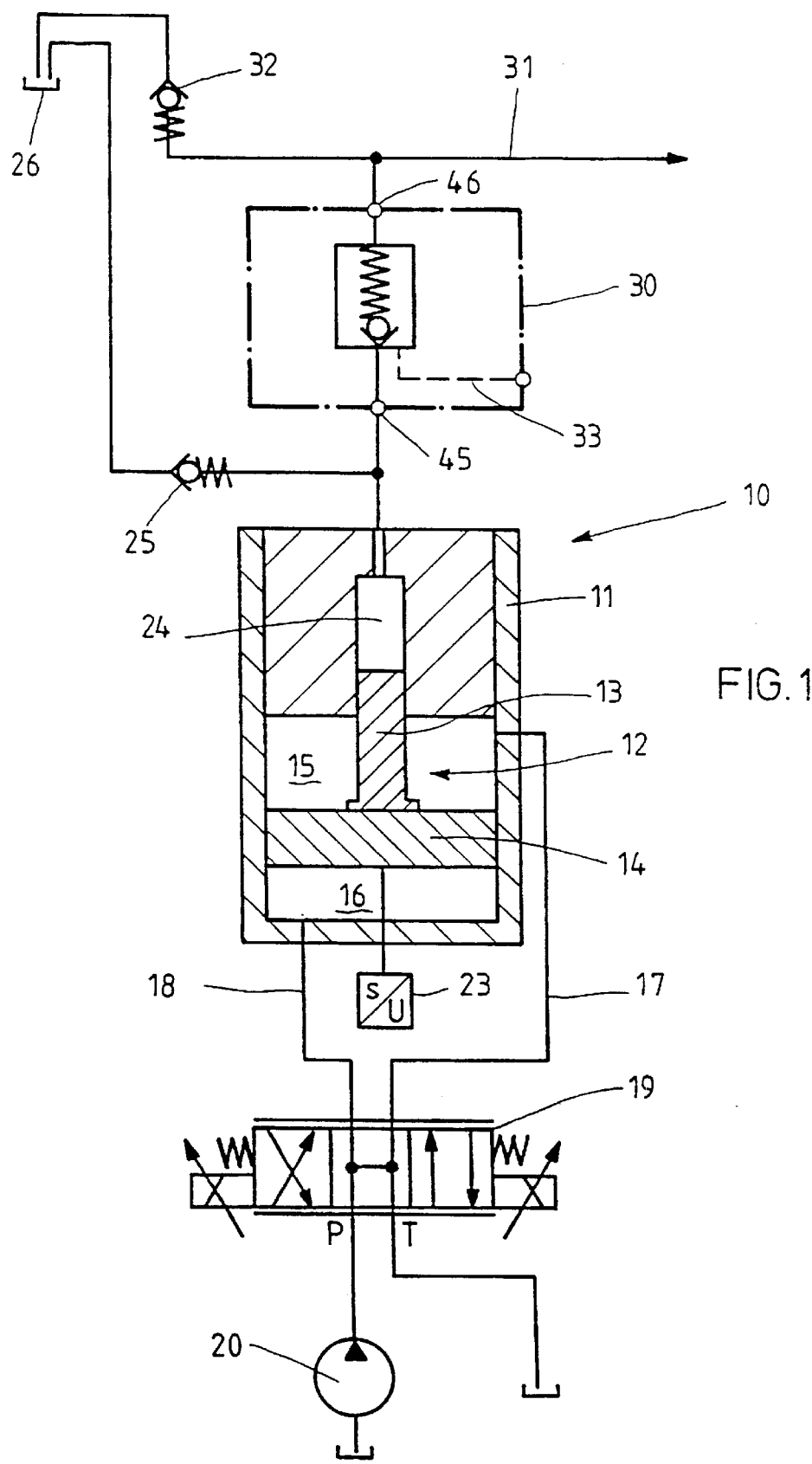
FIG. 1 shows the hydraulic circuit diagram.

The circuit diagram of FIG. 1 only shows an excerpt from the hydraulic part of an internal high-pressure forming system. The most important part of the hydraulics of a system of this type is a pressure intensifier 10 which contains, in a multi-part housing 11, a differential piston 12 whose surface ratio determines the ratio of pressure intensification. The diameter of the differential piston 12 is substantially smaller at a secondary piston section 13 than at a primary piston section 14. The latter divides an interior space of the housing 11 into an annular space 15 and a cylindrical space 16. The two spaces are connected via working lines 17 and 18 to a proportionally adjustable directional control valve 19 which, in its central rest position, connects the two working lines, and therefore the annular space 15 and the cylindrical space 16, to a tank via a tank connection T. In a first working position of the directional control valve 19, the annular space 15 is connected to a hydraulic pump 20 via a pump connection P, while the cylindrical space 16 remains connected to the tank. In the other working position of the directional control valve 19, the cylindrical space 16 is connected to the hydraulic pump and the annular space 15 is connected to the tank.

A displacement sensor 23 senses the position of the differential piston 12 with respect to the housing 11.

The space 24 upstream of the end side of the secondary piston section 13 is connected, on the one hand, via a simple check valve 25 which opens toward it, to a storage container 26 which contains a hydraulic fluid based on water. On the other hand, a releasable check valve 30 according to the invention is connected to the pressure space 24 and through said check valve 30 pressure medium can readily flow out of the pressure space 24 to a line 31 which can be connected to the semi-finished product to be formed. The line 31 is also connected to the storage container 26 via a check valve 32 which opens toward it. During operation, the semi-finished product is filled with hydraulic fluid from the storage container 26 via the line 31 and the check valve 32, it also being possible to arrange a pump between the storage container 26 and the check valve 32, which pump brings about filling up to a certain pressure. The directional control valve 19 is then brought into its second working position in which hydraulic oil is supplied by the pump 20 to the cylindrical space 16 of the pressure intensifier 10. The differential piston 12 moves upwards, as viewed in FIG. 1, and displaces hydraulic fluid from the pressure space 24 via the releasable check valve 30 into the line 31, so that the pressure in the semi-finished product to be deformed increases. Depending in each case on how large the volume of the semi-finished product, the increase in the volume by the deformation and the level of the final pressure are, one or more strokes of the differential piston 12 are necessary. For a second stroke, the directional control valve 19 is brought into its first working position, so that the differential piston 12 travels downward and hydraulic fluid is sucked into the pressure space 24 from the storage container 26 via the check valve 25. After the directional control valve 19 is again switched over, hydraulic fluid is pressed in turn out of the pressure space 24 into the line 31 via the check valve 30.

After deformation and calibration of the workpiece is finished, the check valve 30 is released, by applying a control pressure to a control channel 33, so that the space within the workpiece and the line 31 can be decompressed by the differential piston 12 moving back.

Figure 2:
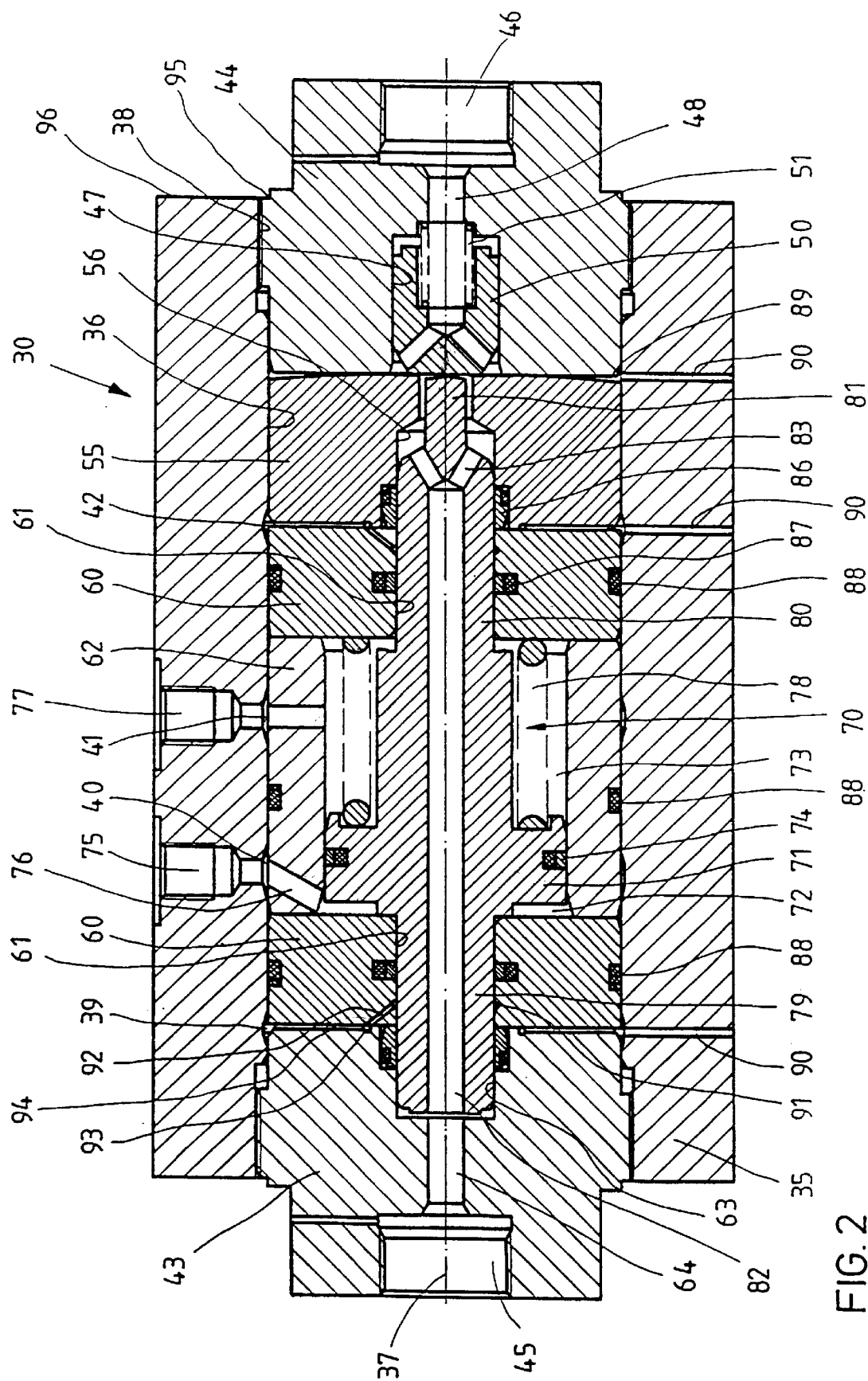
FIG. 2 shows a longitudinal section through the exemplary embodiment of a check valve according to the invention.

The construction and the manner of operation of the check valve 30 emerge in greater detail from FIG. 2. The exemplary embodiment shown there has, according to the invention, a valve housing 35 through which a receiving bore 36 passes whose axis may be referred to as the valve axis 37. The receiving bore 36 has the same diameter throughout, apart from two sections 38 at its two ends, which sections are provided with an internal thread, and apart from flat turned grooves 39, 40, 41 and 42 further to the inside, and in the region of this constant diameter can only be machined from one side of the valve housing 35. A total of six parts are inserted clamped axially against one another into the receiving bore 36. First of all, high-strength inserts 43 and 44 are screwed into the sections 38 of the receiving bore 36 and each of said inserts has, on the valve axis 37, a respective threaded bore 45 or 46, which bores serve as the first or second orifice of the valve and to which a respective pressure line can be connected. The inserts 43 and 44 dip via the sections 38 into the region of constant diameter of the receiving bore 36 and are centered therein. The insert 44 has an inwardly open blind bore 47 which is connected via a relatively narrow channel 48 to the threaded bore 46 and which receives and guides a closing element 50, which is loaded in the direction out of the blind bore 47 by a weak closing spring 51. The insert 44 is followed axially by a likewise high-strength insert 55 which is in the form of a washer and has a central passage 56 with two steps. Around the narrowest section of the central passage the insert 55 serves as a seat for the closing element 50. The insert 55 is followed by a washer 60 having a central passage 61, then by a spacer bushing 62 whose inside diameter is substantially larger than the diameter of the central passage 61 in the washer 60, then by a further washer 60 having a central passage 61, which washer is fitted in the opposite direction to the first washer 60, and then by the insert 43. Like the insert 44, said insert 43 has an inwardly open blind bore 63 which, however, is less deep than the blind bore 47 and also has a smaller diameter. This diameter corresponds with the diameter of the central passages 61 in the washers 60 and with the diameter of the central section of the central passage in the insert 55. The blind bore 63 is also connected to the threaded bore 55 via a channel 64 which is narrower in diameter.

All of the inserts 43, 44, 55, 60 and 62 are centered by the receiving bore 36.

A poppet piston 70 is accommodated in the interior of the inserts 55, 60 and 43 and in the interior of the spacer bushing 62 and with the aid of the poppet piston the closing element 50 can be raised from its seat counter to the force of the closing spring 51 and counter to a force produced by the pressure in the second orifice 46 of the valve.

The poppet piston has a piston collar 71 which is situated within the spacer bushing 62 and divides the space surrounded by the washers 60 and the spacer bushing 62 into two annular spaces 72 and 73. The two annular spaces are sealed off from each other by a sealing arrangement 74 in the piston collar 71. The annular space 72 can be acted upon by a control pressure or relieved from pressure via an external connection 75 and with the aid of a pilot valve (not shown in greater detail). The turn-out 40 of the valve housing 35 and an oblique bore 76 in the spacer bushing 62 lie in the flow path between the external connection 75 and the annular space 72. The other annular space 73 is connected via a second external connection 77 to an oil container for the purpose of equalizing the volume and for conducting away leakage oil, and also accommodates a restoring spring 78 for the poppet piston 70. On both sides of the piston collar 71 the poppet piston has shaft-journal-like end sections 79 and 80 with which it dips through the central passages 61 of the washers 60 and into the blind bore 63 of the insert 43 and into the central passage 56 of the insert 55. Toward the closing element 50 the one end section 80 is extended by a finger 81 which can act upon the closing element 50 through the narrowest section of the central passage 56 of the insert 55. In the rest position shown of the poppet piston 70, there is a small spacing between the finger 81 and the closing element 50. The flow path between the orifices 45 and 46 of the valve leads axially through the poppet piston 70 which, for this purpose, has a long axial bore 82, which opens into the blind bore 63 of the insert 43, and a plurality of small oblique bores 83 at the base of the finger 81.

A maximum pressure seal 86 is accommodated in that section of the central passage 56 of the insert 55 which is the widest and open axially toward the one washer 60, said seal being pressed by the maximum pressure axially against a smooth, uninterrupted encircling surface of the washer 60, but, of course, also acting radially with respect to the poppet piston 70. A seal 87, which is accommodated approximately centrally in an annular groove of the washer 60, which groove is open toward the end section 80, also acts radially. Identical seals 86 and 87 are located in the insert 43 and in the other washer 60. Other seals 88 are located on the outside of the washers 60 between the connection 75 and the turn-out 39 of the valve housing and between the connection 77 and the turn-out 42 of the valve housing and on the outside of the spacer bushing 62 between the two turn-outs 40 and 41.

In the valve which is shown, the separating gaps between the one washer 60 and the insert 43 and between the other washer 60 and the insert 55 and also between the insert 55 and the insert 44 are relieved from pressure. For the pressure relief between the two inserts 55 and 44, that end side of the insert 55 which faces the insert 44 is formed such that it is slightly conical toward the outside at a distance from the valve axis 37, with the result that, on the one hand, for radial sealing, the inserts 44 and 45 can bear tightly against each other far inwards and, on the other hand, an annular space 89 is provided which increases in its axial extent radially toward the outside and from which leakage oil is conducted away via a housing bore 90. For the pressure relief between the washers 60 and the inserts 43 and 55, the washers 60 have in the central passage 61 between the seal 87 and their end side which faces the insert 43 or the insert 55 an axially short and flat annular groove 91 from which an oblique bore 92 originates which, at a radially small distance from the seal 86, appears at that end side of a washer 60 which faces the insert 43 or the insert 55 and is open there to an annular groove 93 formed in the insert 43 or the insert 55. One or more radial channels 94 of small diameter lead from the annular groove 93 outwards to the turn-out 39 or 42 of the valve housing 35 from which in turn leakage oil can be conducted away through housing bores 90. The washers 60 are therefore never exposed to the maximum pressure which is possible in the orifices 45 and 46 of the valve and as regards the selection of material can be matched entirely to their function as guides for the poppet piston 70. They are primarily produced from a copper beryllium alloy. In contrast, the inserts 43, 44 and 55 are loaded by the maximum pressure during operation and are therefore produced from a high-strength material. The fit between the end sections 79 and 80 of the poppet piston and the inserts 43 and 55 is selected in such a manner that the guiding of the poppet piston 70 takes place in the washers 60. Tilting and wedging of the poppet piston 70 is as good as eliminated in the process, since the washers 60 are centered in a region of the receiving bore 36, which region has been machined in a single operation at the same setting of the valve housing and while maintaining the position of the tool.

The seals 87 and 88 in the washer 60 between the spacer bushing 62 and the insert 55 seal off spaces from each other in which essentially the same pressure prevails. Their function essentially involves separating different hydraulic fluids from one another. This is because the annular space 73 is conventionally filled with oil, while the pressure medium used for the high-pressure forming is water.

The insert 44 has a surface 95 which is brought during installation of the valve into alignment with an end surface 96 of the valve housing. This ensures that the separating gaps between the inserts are open toward the turned grooves 39 and 42 and toward a bore 90 and are relieved from pressure. The insert 43 may also be formed in such a manner that a surface on it is aligned, at the correct, axial position of the inserts in the valve housing 35, with the other end surface of the valve housing.

When the releasable check valve which is shown in FIG. 2 is used in the hydraulic circuit according to FIG. 1, the first orifice 45 is connected to the pressure space 24 of the pressure intensifier 10 and the second orifice 46 is connected to the line 31. If the pressure intensifier displaces water out of the pressure space 24, said water flows to the second orifice 46 via the channels 64, 82, 83, 56, via the closing element 50 which is raised from its seat and via the channel 48 in the insert 44. For the decompression which has already been mentioned of the liquid forming means, the annular space 72 is acted upon via the external connection 75 with control pressure, so that the poppet piston moves toward the closing element 50 and raises the latter from its seat. The raising takes place counter to the force of the restoring spring 78 and counter to a compressive force which is caused by a possible pressure difference between the orifices 45 and 46 and by different engagement surfaces on the closing element 50 for the pressures in the orifices 45 and 46, and counter to the virtually negligibly small force of the closing spring 51. The compressive force can indeed be brought virtually to zero at the beginning by a pressure-controlled movement of the differential piston 12. However, during the compression which then follows, a quantity of hydraulic fluid, the amount of which depends on the desired speed at which said compression takes place, has to flow out of the line 31 via the valve 30 into the pressure space 24, as a result of which a pressure difference occurs via the closing element 50. The closing element has to be held open by the poppet piston 70 counter to this pressure difference. Because of the large diameter of the piston collar 71, this is achieved by control pressures which are conventionally built up today by hydraulic pumps.

We claim:

1. Releasable check valve for very high system pressures having a valve housing (35) with a continuous receiving bore (36) located on a valve axis (37), having a closing element (50) which is prestressed in a closing direction by a closing spring (51) and is movable in a direction of the valve axis (37), having a poppet piston (70) which is actable upon at a piston collar (71) by a control pressure to release the closing element (50) and on both sides of the piston collar (71) is guided at end sections (79, 80) of at least approximately identical diameters in the direction of the valve axis (37), and having inserts (43, 55, 60) which are placed into the receiving bore (36) and into said inserts the end sections (79, 80) of the poppet piston (70) dip in order to guide said piston axially or in order to seal spaces upstream of their end sides, which said spaces are exposed to the system pressure, wherein the receiving bore (36) has essentially a same diameter in a region of the inserts (43, 55, 60) and between the inserts, and a spacer bushing (62) is arranged axially between the inserts (43, 55, 60), in which bushing the piston collar (71) is moveable separating two annular spaces (72, 73) on both sides thereof fluidically from each other.

2. Releasable check valve according to claim 1, wherein two inserts (60) bearing directly against two end sides of the spacer bushing (62) are formed identically to each other.

3. Releasable check valve according to claim 1, wherein a first of said inserts (60) bearing against the spacer bushing (62) has, in an annular groove, as a first seal (87) bearing radially against one of said end sections (79, 80) of the poppet piston (70), a second of said inserts (43, 55) following the first insert (60) has, in a turn-out which is open radially with respect to one of said end sections (79, 80) of the poppet piston (70) and axially toward the first insert (80), a second seal (86) bearing radially against one of said sections (79, 80) of the poppet piston (70), axially between the annular groove and an end side of the first insert (60) which faces the second insert (43, 55) an annular channel (91) which is open toward the one of said end sections (79, 80) of the poppet piston (70) is formed in said first insert, an oblique bore (92) passing through the first insert (60) originates from the annular channel (91) and, at a small, radial distance from a turn-out in the second insert (43, 55), exits to outside at the end side of the first insert (60) which faces the second insert (43, 55), a second annular channel (93) extends in a separating gap between the first insert (60) and the second insert (43, 55) in a region where the oblique bore (92) exits, and at least one connecting channel (94) formed between the two inserts (43, 60; 55, 60) runs from the annular channel (93) to an outside diameter of the two inserts (43, 60; 55, 60) and conducts away leakage fluid.

4. Releasable check valve according to claim 1, wherein the two annular spaces (72, 73) on both sides of the piston collar (71) of the poppet piston (70) are each connected to a connection (75, 76) on the valve housing (35) via a flow path, in which an annular channel (40, 41) lies between the spacer bushing (62) and the valve housing (35), and a seal (88) between the spacer bushing (62) and valve housing (35) is arranged axially between the two annular channels (40, 41).

5. Releasable check valve according to claim 1, wherein two inserts (43, 60; 55, 60) are arranged at least on one of the sides of the spacer bushing (62), a separating gap between the two inserts (43, 60; 55, 60) is relieved from pressure via an annular channel (39, 42, 89) between the inserts (43, 60; 55, 60) and the valve housing (35) and via a bore (90) in the valve housing (35), and an outermost insert (43, 44) of the inserts on the one side of the spacer bushing (62) has an edge or a surface (95) which, in a designated position of the inserts (43, 44, 55, 60) with respect to the annular channel (39, 42, 89), lies flush with an end surface (96) of the valve housing (35).

6. Releasable check valve according to claim 5, wherein in the designated position of the inserts (43, 44, 55, 60) with respect to the valve housing (35) two outermost inserts (43, 44) each lie with the edge or the surface (95) flush with the end surface (96) of the valve housing (35).

* * * * *